United States Patent [19]

Lambrecht

[11] Patent Number: 4,679,474
[45] Date of Patent: Jul. 14, 1987

[54] CUTTING THERMOPLASTIC WEBS

[75] Inventor: Emiel Lambrecht, Gijzegem-Aalst, Belgium

[73] Assignee: FMC Corporation, Chicago, Ill.

[21] Appl. No.: 806,234

[22] Filed: Dec. 6, 1985

[51] Int. Cl.$^4$ ............................................... B26D 7/10
[52] U.S. Cl. ........................................ 83/171; 83/428;
   493/194; 493/196; 493/227; 493/239; 493/369
[58] Field of Search .......................... 83/428, 171, 15;
   493/194, 196, 227, 239, 369

[56] References Cited
U.S. PATENT DOCUMENTS

| | | | |
|---|---|---|---|
| 157,815 | 12/1874 | Hall | 83/428 |
| 3,927,588 | 12/1975 | Laderach | 83/171 X |
| 4,161,898 | 7/1979 | Wingen | 83/171 |
| 4,368,051 | 1/1983 | Lehmacher | 493/11 |
| 4,398,903 | 8/1983 | Lehmacher | 493/226 |

Primary Examiner—Donald R. Schran
Attorney, Agent, or Firm—Louis J. Pizzanelli; Douglas W. Rudy; Richard B. Megley

[57] ABSTRACT

Disclosed is an apparatus for slitting a continuous strip of thermoplastic web by a knife heated to a temperature below the melting or fusing temperature of the web. By heating the knife the cutting force is substantially reduced.

2 Claims, 3 Drawing Figures

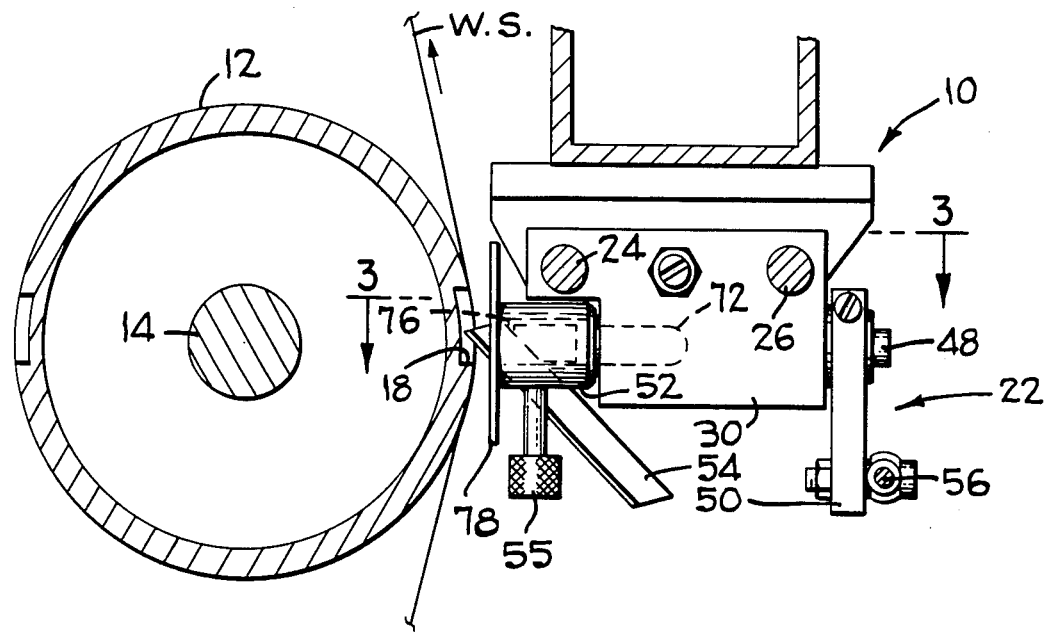
FIG_2
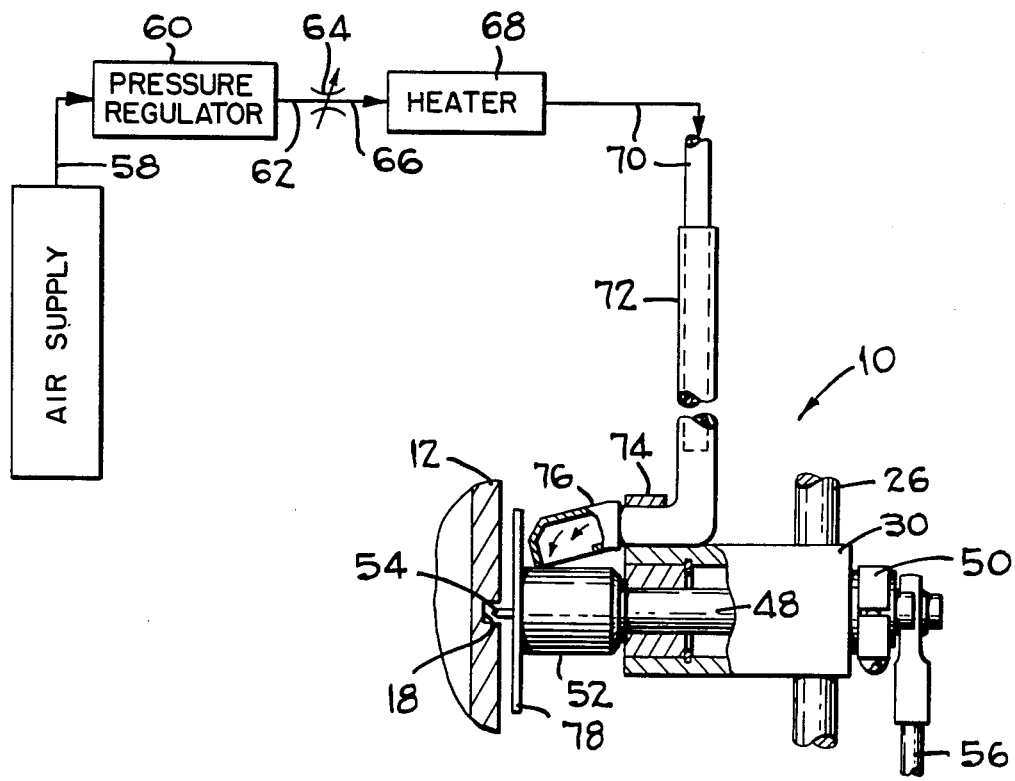
FIG_3

CUTTING THERMOPLASTIC WEBS

The present invention relates to cutting thermosplastic webs and more particularly relates to heating a web slitting knife.

Patented prior art relating to the subject matter of the present invention includes U.S. application Ser. No. 703,000 filed Feb. 19, 1985 and entitled Thermal Plastic Bag Machine and U.S. Pat. Nos. 4,368,051 and 4,398,903. By reference to these patent documents it is intended that there disclosure, including the prior art cited therin, be incorporated herein. In addition U.S. application Ser. No. 703,000, filed Feb. 19, 1985, entitled Thermoplastic Bag Machine is referenced hereto.

Prior art, other than the prior art cited above, has utilized the idea of heating a knife to facilitate perforating or cutting stationary thermoplastic sheets by utilizing a heated cutting knife. In this regard U.S. Pat. No. 4,451,249 discloses heating a knife to a temperature ranging between 93 and 105 degrees centigrade. In all known uses of a heated knife, heating is accomplished by inserting in the knife holder a resistance heater electrically connected to a source of power. Means are provided for monitoring and maintaining the temperature of the knife at a selected level.

According to the present invention, a blade like knife is positioned in cutting relationship with a continuous two-ply strip of thermoplastic web in order to effect slitting thereof. The knife is mounted for continuous controlled transverse movement relative to the direction of web movement while at the same time being oriented so that the plane of the knife is substantially tangent to the line along which the web is cut. Due to the fact that the knife is traversed and concurrently articulated to assume tangency, heating thereof by use of conventional measures, such as a resistance heater, presents a variety of problems one of which being that any electrical leads to a resistance heater would experience a high cycle rate of reverse bending and accordingly bring about fatigue failure.

In accordance with the present invention, the slitting blade is heated by directing a heated fluid against the blade retaining holder which in turn, by conduction, heats the knife retained thereby. Air directed to the knife holder may be derived from any suitable source of pressurized air passing through a pressure regulator, a flow regulator and a heater before it is introduced into a conduit having its discharge directed to the knife holder.

BRIEF DESCRIPTION OF THE DRAWINGS

FIG. 2 is a section taken substantially on the line 2—2 of FIG. 1 illustrating in greater detail of the relationship of the knife to the web, and FIG. 3 is a partial section of FIG. 2 taken substantially along the line 3—3.

DESCRIPTION OF THE PREFERRED EMBODIMENT

Figure 1:
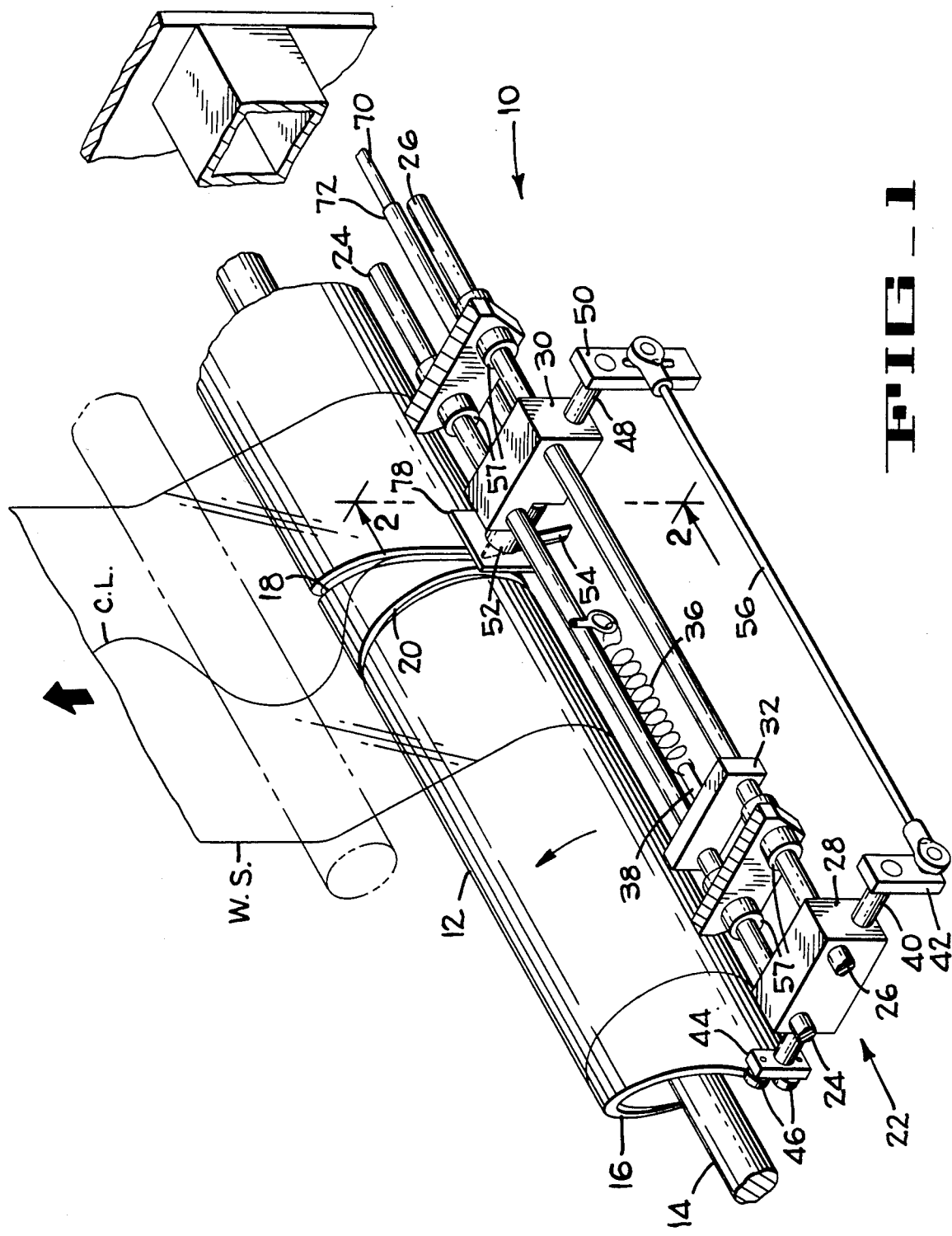
FIG. 1 is a fragmentary perspective of the heated web slitting knife of the present invention.

The above identified U.S. application Ser. No. 703,000, which is assigned to the assignee of the present invention, discloses a system for slitting a continuous thermoplastic web to produce, in its medial portion a wavy, generally sinusoidal line of cut. The portion of the apparatus shown in FIG. 1 substantially duplicates subject matter of the referenced application and it will be described herein to the extent being necessary to clearly describe the present invention.

The web cutting apparatus of FIG. 1 is generally identified by the numeral 10 and its principle components comprise a drum 12 fixed to a shaft 14 rotated by the drive train of the bag machine (not shown). Formed on one end of the drum 12 is a cam 16 having a profile which will generate a wavy generally sinusoidal cut or slit. The drum 12 has formed therein a continuous groove 18 defining a cam track in phase with the cam 16. The drum also has formed therein a groove 20 substantially located in a plane perpendicular to the axis of the drum 12 and serving to receive the cutting knife, (hereinafter identified and described) when cutting of a wavy sinusoidal slit is disabled. The above identified application disclosed the mechanisms and more completely describes the purpose of deploying the knife in groove 20.

A knife supporting and traversing mechanism 22 comprises a pair of guide rods 24 and 26 extending through and clamped or suitable rigidly fixed to blocks 28 and 30 and an intermediate block 32 associated with a stationary biasing device such as a coil spring 36 having a output rod 38 fixed to the block 32. Block 28 is provided with a bore rotatable receiving a shaft 40 having a lever 42 fixed on one end and a block 44 rotatably mounting spaced rollers 46 engagable with the cam 16. The output direction of the bias provided by the spring 36 maintains rollers 46 in contact with the cam 16 which results in transferring the displacement resulting from the cam profile to the rods 26 and 24. Block 30 has a shaft 48 rotatable mounted therein and provided, on one end, with a link 50 and a knife holder 52 on the other end having a knife 54 releasable clamped therein by a screw 55 in FIG. 2. The levers 42 and 50 are interconnected by a rod 56 which is effective to transfer rocking motion of the shaft 40 occasioned by the pair of rollers 46 running along with the surface of cam 16 in order to maintain the knife oriented to define a tangental relationship with the groove 18 such that the trailing flank of the cutting edge follows the path of cut.

The traversing mechanism 22, as shown in the above referenced application, is mounted on a support including slider bearings 57 to permit free linear movement to the mechanism 22.

It should be know that FIG. 1 illustrates the web W.S. in contact with the surface of the drum 12 and that the knife 54 provides a wavy generally sinusoidal, cut line C.L.

According to the present invention air or any other suitable fluid is directed to the knife holder 52 to effect heating thereof, and by conduction, heating of the knife 54 to a selected temperature range in order to facilitate cutting of the web. As mentioned above the knife temperature is selected substantially below the melting or fusing temperature of the web material which becomes particularly important in the event movement of the web across the drum 12 is arrested or if the web strip W.S. moves across the drum in increments occasioned by use of an intermittently operating bag machine. However, the environment in which the web cutting apparatus of the present invention is used provides for continuous motion of the web strip W.S. over the drum 12.

With reference to FIG. 3, air from a suitable source of pressurized air is supplied by conduit 58 to a conventional pressure regulator 60 and thence by conduit 62, the air at the selected pressure, is connected to a conventional flow regulator 64. From the flow regulator the air flows by conduit 66 to a heater 68 which may be a resistant heater provided with controls to establish the exit temperature before the air is introduced into a conduit 70 having a portion thereof slidably mounted in an L-shaped pipe 72 fixed to the block 30 by strap 74. On the end of L-shaped pipe a discharge nozzle or hood 76 is secured and the air flowing thereto is directed, as indicated by the arrows, to the knife holder 52. The knife holder after an appropriate period of warm-up, will assume a constant temperature and of sufficient elevation so that, through conduction, will raise the temperature of the knife to a range of from 90° to 105° centigrade. It should be observed that the conduit 70 is slidably received in the conduit 72 so that, in response to the reciprocation of the block 30, heated air is continually discharged to the knife holder 52.

Stray air currents, resulting from the air stream directed against the knife holder 52, are substantially directed away from the web moving over the drum by a shield 78 formed with a slot through which the knife 54 projects and fixed to face of the knife holder 52 adjacent the drun 12.

Although the best mode contemplated for carrying out the present invention has been herein shown and described, it will be apparent that modification and variation may be made without departing from what is regarded to be the subject matter of the invention as defined in the appended claims.

What I claim is:

1. In a thermoplastic web slitting machine having a rotatable drum supporting a web passing thereover and a knife having its cutting edge received in a continuous groove formed in the surface of the drum and a knife holder for mounting said knife so that its cutting edge is maintained in the circumferential groove, the improvement comprising:

a source of heated fluid including a heater, a pressure regulator and a flow regulator;

conduit for receiving and delivering said heated fluid, said conduit having a portion thereof slidably mounted in an L-shaped pipe;

a discharge hood secured to the end of said L-shaped pipe whereby heated fluid flowing thereto is directed to said knife holder.

2. The invention in accordance with claim 1 wherein said knife holder includes a shield formed with a slot through which the knife projects fixed to the face of the knife holder whereby the fluid stream directed against the knife holder is substantially directed away from said thermoplastic web.

* * * * *